United States Patent [19]

Kaneko et al.

[11] Patent Number: 4,972,223

[45] Date of Patent: Nov. 20, 1990

[54] CAMERA WITH AUTOMATIC EXPOSURE FUNCTION WHICH IS OPERATABLE IN A NORMAL PHOTOGRAPHY MODE AND A SLOW PHOTOGRAPHY MODE

[75] Inventors: Kiyotaka Kaneko; Izumi Miyake; Yoshio Nakane; Yutaka Maeda; Hiroshi Shimaya, all of Tokyo, Japan

[73] Assignee: Fuji Photo Film Co., Ltd., Kanagawa, Japan

[21] Appl. No.: 363,711

[22] Filed: Jun. 9, 1989

[30] Foreign Application Priority Data

Jun. 14, 1988 [JP] Japan .................................. 63-144616

[51] Int. Cl.$^5$ ................................................. G03B 7/08
[52] U.S. Cl. ..................................... 354/443; 354/442; 354/267.1; 354/459
[58] Field of Search ..................... 354/442, 443, 258.1, 354/267.1, 459

[56] References Cited

U.S. PATENT DOCUMENTS

| | | | |
|---|---|---|---|
| 3,924,263 | 12/1975 | Alessi | 354/459 |
| 4,089,014 | 5/1978 | Ueda et al. | 354/442 |
| 4,582,413 | 4/1986 | Suzuki et al. | 354/267.1 |

Primary Examiner—Russell E. Adams

[57] ABSTRACT

A camera having an ordinary automatic exposure function which automatically decides a proper shutter speed and f-stop based on the results of photometry is additionally provided with a slow-photography mode. When the camera is set to the slow-photography mode, a predetermined shutter speed and f-stop outside a range of shutter speeds and f-stops capable of being set by ordinary automatic exposure control is set. This makes it possible to photograph night scenes, fireworks displays and the like. Photography is possible even in a light-value region in which the camera shutter would be locked against release in ordinary automatic exposure control owing to too little light.

17 Claims, 4 Drawing Sheets

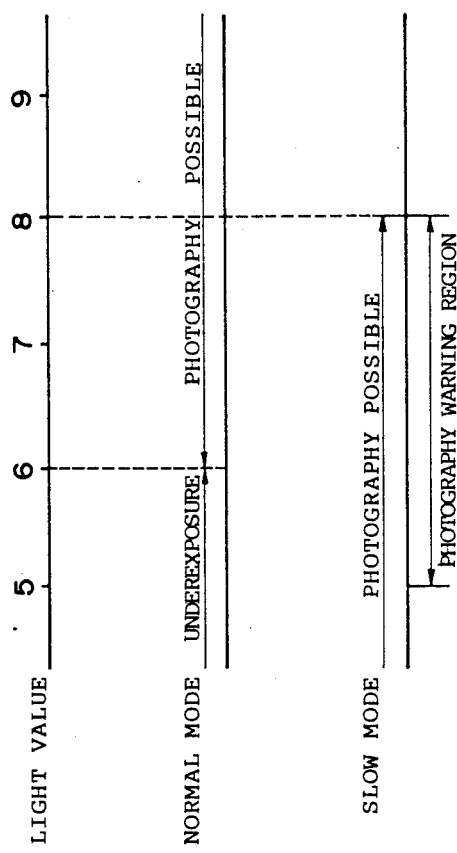

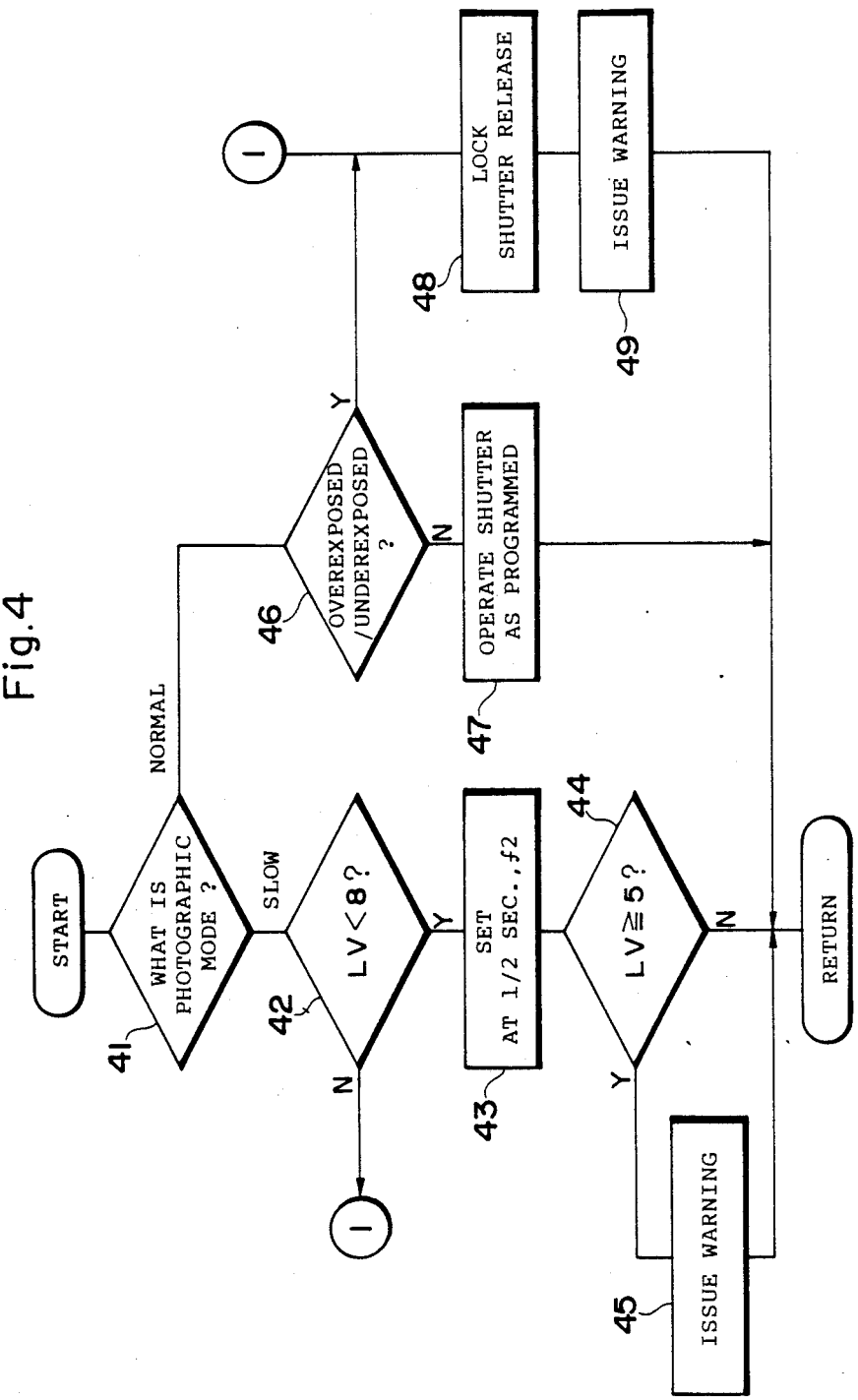

CAMERA WITH AUTOMATIC EXPOSURE FUNCTION WHICH IS OPERATABLE IN A NORMAL PHOTOGRAPHY MODE AND A SLOW PHOTOGRAPHY MODE

BACKGROUND OF THE INVENTION

1. Field of the Invention: exposure function for deciding shutter speed and f-stop for determining the amount of exposure based on the results of photometry.

2. Description of the Prior Art:

Cameras are available having an automatic exposure function (so-called "AE cameras") for measuring the illuminance or light value of incident light and deciding an appropriate shutter speed and f-stop based on a program diagram or the like in accordance with the results of photometry. In order for an AE camera to photograph a subject in an appropriate manner, the range of exposures for which settings can be made is predetermined in terms of shutter speed and f-stop (e.g., 1/1000 –1/15 sec. for shutter speed and f2–f16 for f-stop). When the measured light value of incident light is outside the abovementioned range (as when the environment is dark), the AE camera is incapable of setting the proper exposure, in which case the shutter-release button of the camera is locked to prohibit photography.

However, there are times when the operator of an AE camera wishes to perform photography in a region of low illumination, as when photographing a night scene, fireworks or the like. At such times, prohibition of photography in an AE camera in the manner described above is highly inconvenient.

Although AE cameras which permit a locked shutter-release button to be unlocked are available, the shutter speed usable when the button is unlocked is fixed at 1/15 sec. A shutter speed of this value does not allow photography of fireworks or the like.

SUMMARY OF THE INVENTION

An object of the present invention is to provide a camera equipped with an automatic exposure function that allows photography in a region of low illumination.

According to the present invention, the foregoing objects are attained by providing a camera equipped with an automatic exposure function, comprising first setting means for setting a slow-photography mode, photometer means for measuring a light value of incident light, exposure deciding means operative, when the measured light value is within a range in which ordinary photography is possible, for deciding shutter speed and f-stop based on the measured light value in such a manner that an exposure suitable for photography of a subject is attained, and second setting means operative, when the slow-photography mode has been set, for setting a predetermined shutter speed and f-stop outside a range of shutter speeds and f-stops settable by the exposure deciding means.

In a preferred embodiment of the camera equipped with the automatic exposure function, photography in the slow-photography mode is allowed when the measured light value is less than a predetermined value.

Thus, in accordance with the invention, a slow-photography mode is provided in addition to the automatic exposure operation (referred to as the "normal-photography mode"). Control of exposure in the normal-photography mode is performed by the exposure deciding means. The range of shutter speeds and f-stops capable of being set by the exposure deciding means is predetermined. When, in accordance with the invention, the slow-photography mode has been set, photography is allowed with a predetermined shutter speed and f-stop set outside the range of shutter speeds and f-stops settable by the exposure deciding means. Accordingly, photography is possible even in a low-illumination region where photography cannot be performed in the normal-photography mode. This makes it possible to take photographs of night scenes, fireworks and the like.

Although a case will be described in detail wherein the invention is applied to a still-video camera of the type in which a video signal representing the image of a photographed subject is recorded on a magnetic disk, it goes without saying that the invention is applicable also to a digital still-video camera in which a video signal is stored in memory and is then converted into digital data, a silver-chloride camera for producing photographic images on film, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a view showing the relationship between normal and slow modes and LV values at the time of photography; and FIG. 4 is a flowchart illustrating processing for deciding shutter f-stop.

DESCRIPTION OF THE PREFERRED EMBODIMENT

Figure 1:
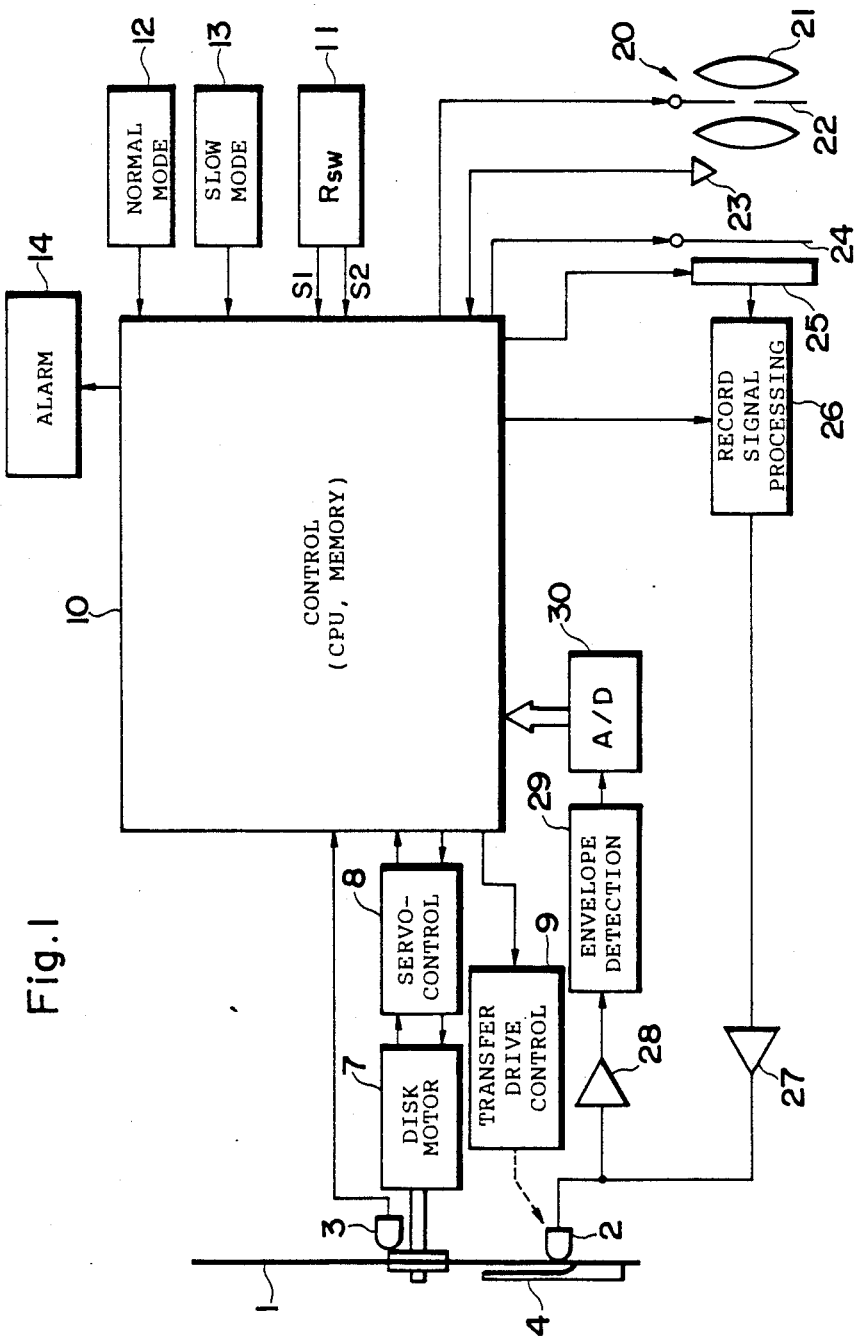
FIG. 1 is a block diagram illustrating part of the electrical construction of a still-video camera.

FIG. 1 is a block diagram schematically illustrating part of the electrical construction of a still-video camera.

A magnetic disk 1 is housed in a disk pack in a rotatable state. A still-video camera is provided with a bucket capable of being freely opened and closed and of receiving the disk pack when opened. After the disk pack is so loaded and when the bucket is closed the magnetic disk 11 is chucked on the spindle of a disk motor 7.

The magnetic disk 1 is provided with a plurality (e.g. 50) of circular, concentrically disposed tracks having a track pitch of, e.g. 100 microns. Magnetically recorded on each track or on pairs of tracks by imaging processing is a frequency-modulated color still video signal (inclusive of luminance and chrominance signals, etc.) corresponding to one field or one frame.

The 50 tracks concentrically provided on the magnetic recording surface of the magnetic disk 11 are numbered consecutively from No. 1 to No. 50 starting from the outer side of the disk. A home position HP (namely an origin position or standby position) is situated on the outer side of track No. 1.

Operation of each component of the still-video camera and operation of the camera as a whole is under the control of a control unit 10. The later comprises a central processor, preferably a microprocessor (hereinafter referred to as a "CPU"), a memory for storing programs executed by the CPU as well as the required data, and an interface for interfacing peripheral elements, circuits and devices.

A transfer drive controller 9 is provided for supporting a magnetic head 2, which is for writing a still-video signal of an imaged subject on a predetermined track of the magnetic disk 11. The transfer drive controller 9 supports the magnetic head 2 in such a manner that the head 2 may travel freely radially of the magnetic disk 1, and controls the travel of the head 2 radially of the disk. The control unit 10 provides the controller 9 with commands regarding the direction in which the magnetic head 2 is to be moved and the amount of such movement. The controller 9 includes a stepping motor for moving the magnetic head 2 by an amount proportional to the angle through which the motor is rotated.

In order to achieve good contact between the magnetic head 2 and the rotating magnetic disk 1, a regulating plate 4 is provided on the side of the magnetic disk 1 opposite the magnetic head 2. A phase detector 3 for generating one pulse each time the magnetic disk 1 makes one full revolution is provided in close proximity to the core of the magnetic disk 1. The detection pulse from the phase detector 3 is inputted to the control unit 10.

The disk motor 7 is subjected to feedback control by the servo-control circuit 8 so as to be rotated at a constant speed, e.g. 3,600 rpm. The servo-control circuit 8 is also adapted to start and stop the motor 7 in response to commands from the control unit 10.

The still-video camera has an imaging optical system 20 comprising an imaging lens system 21 for forming the image of a subject, a diaphragm 22 and an optical shutter 24. As will be described below, the diaphragm 22 has its f-stop controlled, along with the shutter speed of the shutter 24, by the control unit 10 based on the level of a light reception signal, which represents the detected light value of incident light, from a photometric element 23 arranged in the optical path. The optical shutter 24 is controlled by the control unit 10 in response to an input from a switch S2 closed by the operator s pressing a shutter-release button 11, by an operation described below, through a second step of a two-step stroke. A solid-state imaging device 25 comprising a two-dimensional imaging cell array, such as a CCD is arranged in the focal plane of the optical system 20. Video data stored in the imaging device 25 is read in the form of a serial video signal in synchronism with vertical and horizontal synchronizing signals, provided by the control unit 10, in synchronism with the phase detection pulses from the phase detector 3. The luminance signal component and color difference signal component of this signal are frequency-modulated by a recording signal processing circuit 26, which mixes the resulted modulated signals and applies them to a driver circuit 27. When the magnetic disk 1 is rotated at the aforementioned constant rotational speed, a frequency-modulated video signal is written on the predetermined track by the magnetic head 2.

In track search processing and check processing, the signal read by the magnetic head 2 is delivered to an envelope detector circuit 29 via a preamplifier 28. The envelope detector circuit 29 detects the envelope of the signal read by the magnetic head 2, namely the envelope of the frequency-modulated video signal recorded on a track of the magnetic disk 1, and outputs a voltage signal conforming to the detected envelope. This voltage signal representing the envelope is fed into an analog/digital (A/D) converter 30, which proceeds to convert the signal into an eight-bit digital signal representing a quantization level of, e.g. 256. This signal enters the control unit 10.

The envelope detection signal is used in determining whether a track on the magnetic disc 1 is blank or a track that has been recorded on, namely a "recorded"-track. If the detection signal level does not reach a predetermined threshold level when the magnetic head 2 is fed across a track, that track is blank.

The envelope detection signal is used in recording check processing as well. Recording check processing, which is performed after an imaged still-video signal is recorded on a prescribed track by the magnetic head 2, entails performing a check to see whether the recording has actually taken place. If the envelope detection signal is above a predetermined threshold level, a decision is rendered to the effect that recording has been performed.

In addition to controlling the rotation of the magnetic disk 1, the recording of the video signals, the track search operation and the reading of various switches, the control unit 10 controls exposure, namely the f-stop of the diaphragm 22 and the shutter speed of the shutter 24, based on the light value detection signal from the photometric element 23 in accordance with the set mode.

Switch input signals from a power supply switch (not shown), the shutter-release button 11 and the like enter the control unit 10. The shutter-release button 11 is of the two-step stroke type; switch S1 is closed when the button is pressed through the first step of its stroke, and switch S2 when the button is pressed through the second step of its stroke. When the switch S1 is closed, the disk motor 7 is driven into operation and photometry for exposure control in the normal mode, described below, is started. When switch S2 is subsequently closed, photography and recording are carried out.

The control unit 10 is provided with a setting switch 12 for the normal-photography mode, a setting switch 13 for the slow-photography mode, and an alarm 14. The normal-photography mode (hereinafter referred to simply as the "normal mode") refers to a mode in which shutter speed and f-stop are decided automatically in conformity with light value measured by the photometric element 23. The normal mode may be considered to be identical with that implemented conventionally in an AE camera or the like. Specifically, the light-value range over which exposure control is possible is predetermined, and the ranges of shutter speeds and f-stops capable of being set in conformity with the light-value range are also predetermined. The slow-photography mode (hereinafter referred to simply as the "slow mode") is used when photographing a night scene, fireworks, etc., namely when the environment is dark. In this mode, a shutter speed and f-stop suited to low illumination, which cannot be set in the normal mode, are capable of being set. If it is arranged so that the normal mode is set whenever the slow mode is not set, i will be unnecessary to provide the normal mode setting switch 12. The alarm 14, which is a buzzer or indicator lamp, indicates that the light value of incident light is unsuitable for photography in each of the abovementioned modes. The alarm 14 is connected to the control unit 10.

In the normal mode, basically there are two methods of controlling f-stop and shutter speed based on the detected light value of incident light. In one method, a table of predetermined optimum f-stops and optimum shutter speeds which are optimum with regard to light values is stored in a memory within the control unit 10. Then, using the detected light value as a key, the optimum f-stop and optimum shutter speed are read out of the table. In the other method, computation formulae for obtaining optimum t-stop and shutter speed are incorporated in a program of the control unit 10, and an optimum f-stop and optimum shutter speed are found by substituting the light value in the formulae. &n doing so, generally the optimum f-stop is obtained first in accordance with the detected light value, and then the shutter speed is calculated using the f-stop obtained.

Figure 2:
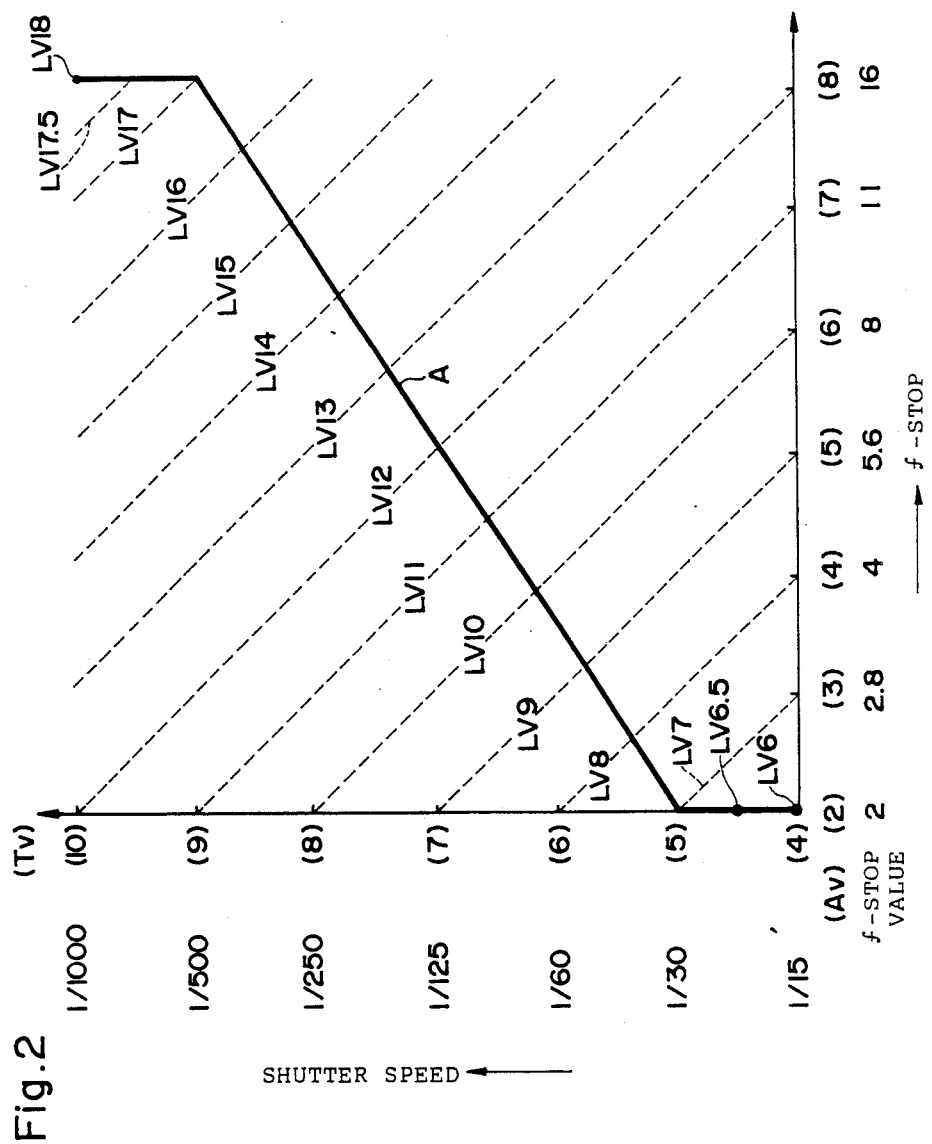
FIG. 2 illustrating a program diagram for deciding a shutter speed and f-stop in accordance with measured light value.

FIG. 2 illustrates a so-called program diagram. This can be considered as being obtained by expressing the abovementioned table in the form of a graph, or by expressing the results of calculation using the abovementioned formulae in the form of a graph.

In FIG. 2, f-stop is plotted along the horizontal axis, with each f-stop being accompanied by an Av (aperture value) enclosed in parentheses. Shutter speed (in units of seconds) is plotted along the vertical axis, with each shutter speed being accompanied by a Tv (time value) enclosed in parentheses. The dashed lines in FIG. 2 indicate all combinations of f-stops and shutter speeds which give a proper exposure at each light value LV, with the latter being a parameter. Only typical light values are illustrated, namely LV6, LV6.5, LV7, LV8, LV9, ..., LV16, LV17, LV17.5, and LV18.

The solid line A in FIG. 2 illustrates an example of f-stops and shutter speeds, from among the aforementioned combinations, which give optimum exposure with respect to detected light values.

When the normal mode is set, shutter speed and f-stop are decided, in accordance with the solid line A in the program diagram of FIG. 2, in dependence upon the detected light value. The range of light values of incident light within which automatic exposure control is possible in the normal mode is LV6 through LV18 in the present embodiment. If the light value of incident light is less than LV6 (underexposure) and greater than LV18 (overexposure), photography is prohibited. In other words, a warning indication is given and the shutter-release button 11 is locked to prevent release. Rather than adopting this release-lock expedient, it is permissible to arrange it so that photography is prohibited by ignoring the input signal produced by pressing the shutter-release button 11. As will be appreciated from the solid line A in FIG. 2, exposure is set within a range of from 1/15 sec. for shutter speed and f2 for f-stop to 1/1000 sec. for shutter speed and f16 for f-stop in the light value range of LV6–LV18 in the normal mode.

In the slow mode, shutter speed and f-stop are set to be outside the set range of the normal mode. For example, in the present embodiment, shutter speed and f-stop are set at 1/2 sec. and f2, respectively, in the slow mode. When the slow mode is set and the light value LV detected by the photometric element 23 is greater than LV8, the shutter is locked against release since overexposure will occur if photography is performed based on exposure decided by the abovementioned f-stop and shutter speed. If the measured light value is in the range LV5–LV8, overexposure is a possibility and, hence, a warning to this effect is given by the alarm 14. However, photography is allowed and the shutter is not locked against release.

The ranges over which exposure is controllable in the normal mode and slow mode described above are shown together in FIG. 3.

FIG. 4 is a flowchart illustrating the procedure of exposure control processing which determines shutter speed and f-stop at the time of photography.

It is judged at a step 41 whether the photographic mode is the normal mode or slow mode. This judgment is made based on input signals from the mode setting switches 12, 13 set by the operator.

When the photographic mode is set to the normal mode at step 41, it is determined at step 46 whether the light value detected by photometric element 23 lies within a range in which photography is capable of being performed properly by the automatic exposure function of the still-video camera. (In other words, it is determined whether the light value is less than LV6 or greater than LV18.) If the light value is found to be within the proper range (NO at step 46), then shutter speed is calculated at step 47, in dependence upon the detected light value, based on a program diagram of the kind shown in FIG. 2. By pressing the shutter-release button 11 through the second step of its stroke, photography is started and recording is performed on a prescribed track of the video floppy 1.

If overexposure or underexposure is judged to occur (YES at step 46) when photography is performed at the detected light value, the shutter-release button 11 is locked against release at step 48 to prohibit photography. In addition, the alarm 14 gives a warning indication at step 49 to warn the operator.

When it is determined that the photographic mode has been set to the slow mode, it is judged at step 42 whether the LV value of the illuminance detected by the photometric element 23 is less than 8. When the LV value is greater than 8 (NO at step 42), the shutter-release button 11 is locked against release at step 48 to prohibit photography, and the warning is issued at step 49.

When the LV value is found to be less than 8 (YES at step 42), the f-stop is set at f2 and the shutter speed is set at 1/2 sec. at step 43. Next, it is determined at step 44 whether the detected light value LV is greater than 5. When the light value is greater than LV5 (NO at step 44), the operator is warned by an indication from alarm 14, a buzzing tone from a buzzer, etc. Photography and recording are then performed at the exposure thus determined.

As many apparently widely different embodiments of the present invention can be made without departing from the spirit and scope thereof, it is to be understood that the invention is not limited to the specific embodiments thereof except as defined in the appended claims.

What is claimed is:

1. A camera equipped with an automatic exposure function, comprising:

first setting means for setting a slow-photography mode;

photometer means for measuring a light value of incident light;

exposure deciding means operative, when measured light value is within a range in which ordinary photography is possible, for deciding shutter speed and f-stop based on the measured light value in such a manner that an exposure suitable for photography of a subject is attained; and second setting means operative, when the slow-photography mode has been set, for setting a predetermined shutter speed and f-stop outside a range of shutter speeds and f-stops settable by said exposure deciding means.

2. The camera according to claim 1, wherein photography in the slow-photography mode is allowed when the measured light value is less than a predetermined value.

3. The camera according to claim 1, further comprising means for issuing a warning of overexposure if the measured light value lies within a range in which overexposure would occur during photography in the slow-photography mode when the slow-photography mode has been set.

4. A camera comprising:
selection means for setting operation of the camera in one of a normal-photography mode or a slow-photography mode;
photometer means for detecting a light value of incident light;
calculating means for calculating an optimum shutter speed and f-stop based upon said detected light value; and
control means, coupled to said selection means, said photometer means and said calculating means operable in
said normal-photography mode to set the camera to said optimum shutter speed and f-stop if said detected light value is within a range acceptable for proper exposure to allow photography and to prohibit photography if said detected light value is not within said range, and
said slow-photography mode to set the camera to a predetermined shutter speed and f-stop outside a range of shutter speeds and f-stops settable during said normal-photography mode if said detected light value is less than a first predetermined value.

5. The camera of claim 4 further comprising an alarm wherein said control means is further operable in said slow-photography mode to prohibit photography and activate said alarm if said detected light value is greater than said first predetermined value.

6. The camera of claim 5 wherein said control means is further operable in said slow-photography mode to activate said alarm and allow photography if said detected light value is greater than a second predetermined value.

7. The camera of claim 6 wherein said first predetermined value is greater than said second predetermined value.

8. The camera of claim 7 wherein said control means is further operable in said normal-photography mode to activate said alarm if said detected light value is not within said range and to prohibit photography.

9. The camera of claim 8 wherein said alarm is a buzzer.

10. The camera of claim 8 wherein said alarm is an indicator lamp.

11. The camera of claim 4 wherein said selection means comprises a first selecting means for setting operation of the camera in said normal-photography mode and a second selecting means for setting said camera in said slow-photography mode.

12. The camera of claim 4 wherein said selection means comprises a switch which when activated sets the camera to said slow-photography mode and otherwise sets the camera to said normal-photography mode.

13. A method of operating a camera equipped with an automatic exposure function comprising the steps of:
selecting for operation via a setting means a normal-photography mode which includes the steps of
detecting a light value of incident light with a photometer means,
determining if said detected light value is within a permissable range for acceptable exposure,
calculating and setting an optimum shutter speed and f-stop for said detected light value if said detected light value is within said permissable range to allow photography, and
prohibiting photography if said detected light value is not within said permissable range; and
selecting for operation via said setting means a slow-photography mode which includes the steps of
detecting a light value of incident light with said photometer means,
determining if said detected light value is greater than a first predetermined value,
prohibiting photography if said detected light value is greater than said first predetermined value, and
setting a shutter speed and f-stop outside a range of shutter speeds and f-stops settable during said normal-photography mode when said detected light value is less than said first predetermined value to allow photography.

14. The method of operating a camera of claim 13 further comprising the step of activating an alarm when said photography is prohibited when said normal-photography mode is selected.

15. The method of operating a camera of claim 14 further comprising the step of activating said alarm when said photography is prohibited when said slow-photography mode is selected.

16. The method of operating a camera of claim 15 further comprising the step of activating said alarm and allowing photography when said detected light value is greater than a second predetermined value when said slow-photography mode is selected.

17. The method of operating a camera of claim 16 wherein said first predetermined value is greater than said second predetermined value.

* * * * *